(12) United States Patent
Lai et al.

(10) Patent No.: US 12,253,895 B2
(45) Date of Patent: Mar. 18, 2025

(54) ELECTRONIC SYSTEM AND DETERMINATION METHOD CAPABLE OF DETERMINING REASON OF COLD BOOT EVENT

(71) Applicant: Realtek Semiconductor Corporation, Hsinchu (TW)

(72) Inventors: Chao-Min Lai, Hsinchu (TW); Chien-Liang Chen, Hsinchu (TW); Ming-Tsung Tsai, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 177 days.

(21) Appl. No.: 18/149,653

(22) Filed: Jan. 3, 2023

(65) Prior Publication Data

US 2023/0376319 A1    Nov. 23, 2023

(30) Foreign Application Priority Data

May 17, 2022    (TW) .................................. 111118364

(51) Int. Cl.
*G06F 1/30* (2006.01)
*G06F 1/10* (2006.01)
*G06F 9/4401* (2018.01)
*G06F 11/07* (2006.01)

(52) U.S. Cl.
CPC .................. *G06F 1/30* (2013.01); *G06F 1/10* (2013.01); *G06F 9/4401* (2013.01); *G06F 9/442* (2013.01); *G06F 11/0757* (2013.01); *G06F 11/079* (2013.01)

(58) Field of Classification Search
CPC ..... G06F 1/10; G06F 1/14; G06F 1/24; G06F 1/28; G06F 1/30; G06F 9/4401; G06F 9/442; G06F 11/1417; G06F 11/1441; G06F 11/0757; G06F 11/079; G06F 11/3058

See application file for complete search history.

(56) References Cited

U.S. PATENT DOCUMENTS

| | | | | |
|---|---|---|---|---|
| 6,061,788 | A | * | 5/2000 | Reynaud ............. G06F 11/3024 714/1 |
| 9,437,237 | B1 | * | 9/2016 | Yee ....................... G11B 19/048 |
| 10,410,202 | B1 | * | 9/2019 | Ng ............................. G06F 1/30 |
| 2007/0225909 | A1 | * | 9/2007 | Sakano ................... B60R 25/33 701/532 |
| 2010/0064128 | A1 | * | 3/2010 | Mendelow .......... G06F 11/1441 713/323 |

(Continued)

FOREIGN PATENT DOCUMENTS

| | | |
|---|---|---|
| TW | 201820144 A | 6/2018 |
| TW | 201913290 A | 4/2019 |

*Primary Examiner* — Thomas J. Cleary
(74) *Attorney, Agent, or Firm* — CKC & Partners Co., LLC

(57) ABSTRACT

An electronic system includes a main chip, a non-volatile storage circuit, and a detector circuit. The main chip is configured to read first time of a clock circuit. The non-volatile storage circuit is coupled to the main chip. The main chip stores the first time into the non-volatile storage circuit. The detector circuit includes a first output terminal. The first output terminal is coupled to the main chip. When a cold boot event occurs, the main chip reads the first time from the non-volatile storage circuit, and determines a reason of the cold boot event according to the first time, a second time of the clock circuit, and a logic value at the first output terminal.

18 Claims, 4 Drawing Sheets

(56) References Cited

U.S. PATENT DOCUMENTS

| | | | |
|---|---|---|---|
| 2014/0208093 A1* | 7/2014 | Wu | G06F 9/441 |
| | | | 713/2 |
| 2015/0220123 A1 | 8/2015 | Rosik et al. | |
| 2018/0004956 A1* | 1/2018 | Bertorelle | H04L 63/0853 |
| 2018/0137007 A1* | 5/2018 | Hayashi | G06F 9/4401 |
| 2018/0152579 A1* | 5/2018 | Iwasa | H04N 1/00891 |
| 2023/0214137 A1* | 7/2023 | Palmer | G06F 11/1417 |
| | | | 711/154 |
| 2024/0036882 A1* | 2/2024 | Torres | G06F 9/4411 |

* cited by examiner

ELECTRONIC SYSTEM AND DETERMINATION METHOD CAPABLE OF DETERMINING REASON OF COLD BOOT EVENT

RELATED APPLICATIONS

This application claims priority to Taiwanese Application Serial Number 111118364, filed May 17, 2022, which is herein incorporated by reference.

BACKGROUND

Technical Field

The present disclosure relates to cold boot technology. More particularly, the present disclosure relates to an electronic system and a determination method capable of determining a reason of a cold boot event.

Description of Related Art

With development of technology, various electronic devices or electronic systems are developed. However, due to some reasons, a cold boot event may occur in the electronic devices or electronic systems. The reason is, for example, that the electronic device or the electronic system is normally turned on after being turned off normally, the mains power is restored after the mains power is stopped, a user inserts a plug again after unplugging it by mistake, a user presses a reset key on the hardware, or a power supply circuit fails (a power supply circuit is unstable or the power supply circuit provides insufficient power).

SUMMARY

Some aspects of the present disclosure are to provide an electronic system. The electronic system includes a main chip, a non-volatile storage circuit, and a detector circuit. The main chip is configured to read first time of a clock circuit. The non-volatile storage circuit is coupled to the main chip. The main chip stores the first time into the non-volatile storage circuit. The detector circuit includes a first output terminal. The first output terminal is coupled to the main chip. When a cold boot event occurs, the main chip reads the first time from the non-volatile storage circuit, and determines a reason of the cold boot event according to the first time, a second time of the clock circuit, and a logic value at the first output terminal.

Some aspects of the present disclosure are to provide a determination method for determining a reason of a cold boot event. The determination method includes following operations: when the cold boot event occurs, reading, by a main chip, first time of a clock circuit stored in a non-volatile storage circuit; and determining, by the main chip, the reason of the cold boot event according to the first time, a second time of the clock circuit, and a logic value at a first output terminal of a detector circuit.

As described above, in the present disclosure, the main chip can work with the detector circuit to determine the reason of the cold boot event. Thus, there is no need to dispose an external microcontroller and an additional power supply providing power to the external microcontroller in the present disclosure. Thus, the present disclosure can lower the cost.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
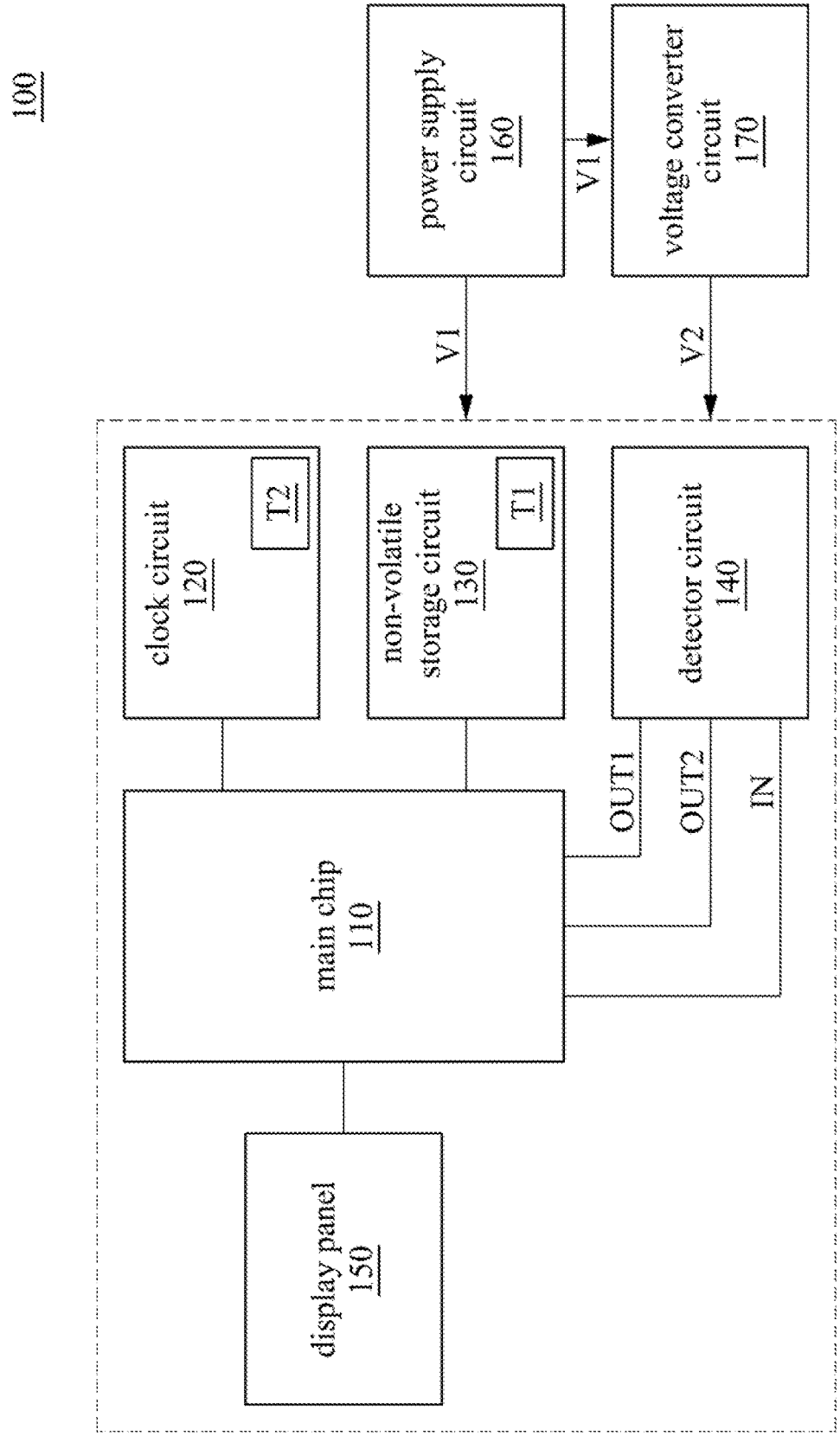
FIG. 1 is a schematic diagram of an electronic system capable of determining a reason of a cold boot event according to some embodiments of the present disclosure.

Reference is made to FIG. 1. FIG. 1 is a schematic diagram of an electronic system 100 capable of determining a reason of a cold boot event according to some embodiments of the present disclosure.

In some embodiments, the electronic system 100 is a server, a smart phone, a desktop computer, a laptop computer, a smart phone, or a smart TV, but the present disclosure is not limited thereto. Various electronic devices or various electronic systems are within the contemplated scopes of the present disclosure.

As illustrated in FIG. 1, the electronic system 100 includes a main chip 110, a clock circuit 120, a non-volatile storage circuit 130, a detector circuit 140, a display panel 150, a power supply circuit 160, and a voltage converter circuit 170.

In some embodiments, the main chip 110 can be implemented by a Central Processing Unit (CPU) or other circuits capable of processing data or controlling. The main chip 110 is mainly used to control overall operations of the electronic system 100. For example, the main chip 110 can control the clock circuit 120, the non-volatile storage circuit 130, the detector circuit 140, and the display panel 150. In some embodiments, the clock circuit 120 can be implemented by a Real-Time Clock (RTC) circuit or other circuits capable of outputting real time. In some embodiments, the non-volatile storage circuit 130 can be implemented by a flash memory or other non-volatile storage elements. In some embodiments, the display panel 150 can be implemented by a display screen, a touch and display screen, or other elements with displaying functions. In some embodiments, the power supply circuit 160 and the voltage converter circuit 170 can be implemented by Application Specific Integrated Circuit (ASICs). In some embodiments, the power supply circuit 160 can be an adaptor or other circuits capable of providing power. In some embodiments, the voltage converter circuit 170 can be a buck converter. The power supply circuit 160 is used to output a voltage V1 (e.g., 5 volts) and the voltage converter circuit 170 is used to convert the voltage V1 into a lower voltage V2 (e.g., 3.3 volts) less than the voltage V1. The voltage V1 and the voltage V2 can be inputted into the electronic system 100 such that some circuits or elements in the electronic system 100 can operate normally.

Regarding coupling relationship, the main chip 110 is coupled to the clock circuit 120, the non-volatile storage circuit 130, the detector circuit 140, and the display panel 150. In the example of FIG. 1, the clock circuit 120 is disposed outside the main chip 110. In some embodiments, the main chip 110 and the clock circuit 120 are coupled to each other through the Inter-Integrated Circuit bus ($I^2C$) bus. In some embodiments, the main chip 110 and the detector circuit 140 are coupled to each other through General Purpose Input/Output (GPIO) pins. As illustrated in FIG. 1, the detector circuit 140 includes an input terminal IN, an output terminal OUT1, and an output terminal OUT2. The input terminal IN, the output terminal OUT1, and the output terminal OUT2 conform the GPIO standard. The input terminal IN, the output terminal OUT1, and the output terminal OUT2 can be coupled to the main chip 110.

Regarding operating, the clock circuit 120 can output real time as a clock. The main chip 110 can read the real time outputted from the clock circuit 120, and the main chip 110 can store it into the non-volatile storage circuit 130. For example, the main chip 110 reads time T1 outputted from the clock circuit 120 with a fixed period (e.g., 1 second) and stores the time T1 into the non-volatile storage circuit 130. Since the non-volatile storage circuit 130 is non-volatile, the data stored in the non-volatile storage circuit 130 will not disappear even if a clod boot event occurs. Accordingly, the main chip 110 can determine a reason of the clod boot event according to the time T1 stored in the non-volatile storage circuit 130, time T2 after the clod boot event, and a logic value at the output terminal OUT1.

The details about how the main chip 110 determines the reason of the clod boot event are described in following paragraphs.

Figure 2:
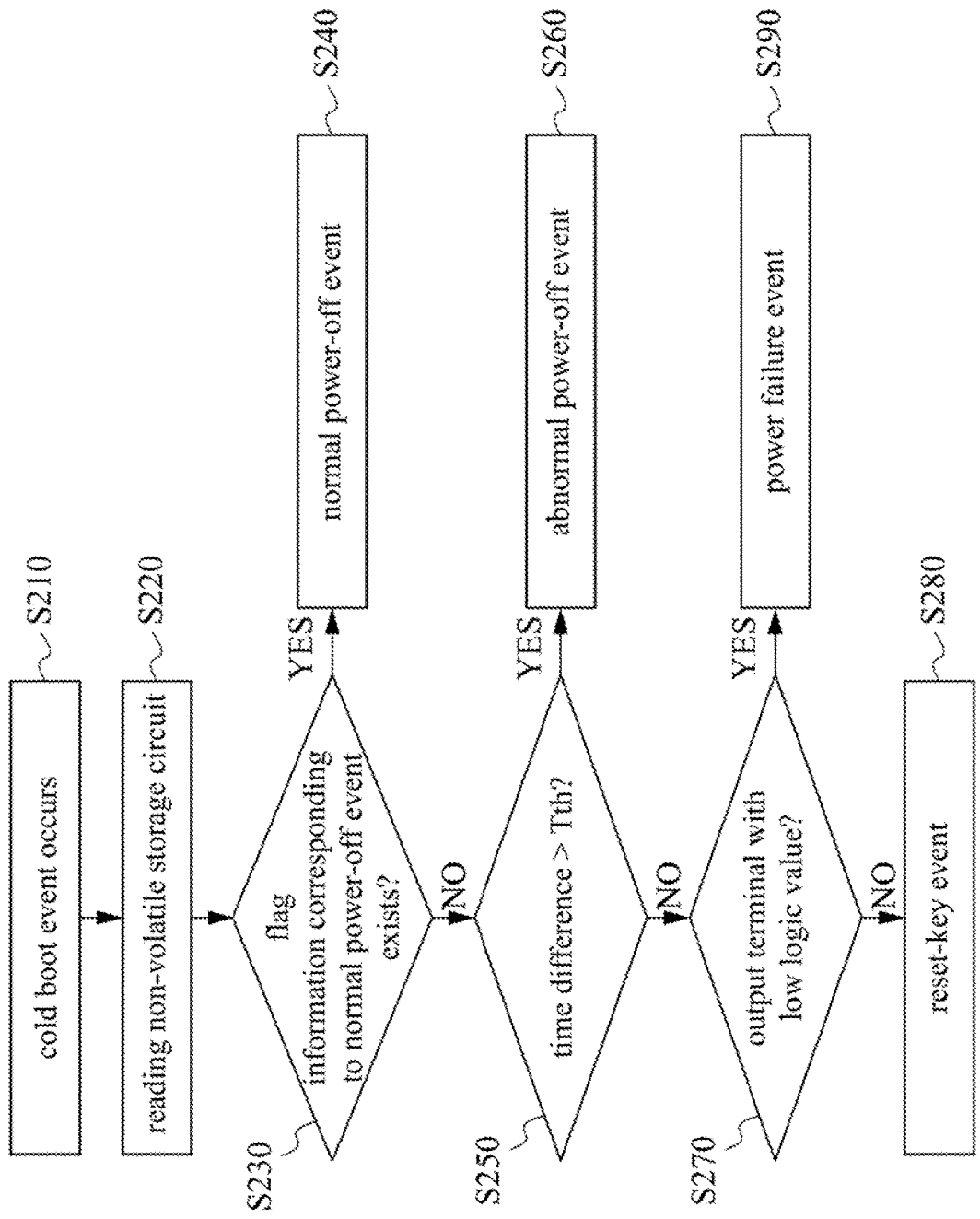
FIG. 2 is a flow diagram of a determination method capable of determining a reason of a cold boot event according to some embodiments of the present disclosure.

Reference is made to FIG. 2. FIG. 2 is a flow diagram of a determination method 200 capable of determining the reason of the cold boot event according to some embodiments of the present disclosure.

In some embodiments, the determination method 200 can be applied to the electronic system 100 in FIG. 1, but the present disclosure is not limited thereto. However, for better understanding, the determination method 200 is described with reference to FIG. 1 in following paragraphs.

As illustrated in FIG. 2, the determination method 200 includes operations S210, S220, S230, S240, S250, S260, S270, S280, and S290.

In operation S210, a clod boot event occurs. For example, the clod boot event occurs in the electronic system 100 when the electronic system 100 is normally turned on after being turned off normally, when the mains power is restored after the mains power is stopped, when a user inserts a plug again after unplugging it by mistake, when a user presses a reset key on the hardware, or when the power supply circuit 160 fails in a short time duration (the power supply circuit 160 is unstable or the power supply circuit 160 provides insufficient power).

In operation S220, the main chip 110 reads the time T1 stored in the non-volatile storage circuit 130. In some embodiments, the time T1 is the last time the main chip 110 reads from the clock circuit 120 before the cold boot event. As describe above, since the non-volatile storage circuit 130 is non-volatile, the time T1 stored in the non-volatile storage circuit 130 will not disappear even if a cold boot event occurs in the electronic system 100.

In operation S230, the main chip 110 determines whether the reason of the cold boot event is a normal power-off event. For example, there is flag information corresponding to the normal power-off event in the non-volatile storage circuit 130 when a user shuts down the electronic system 100 normally (the normal power-off event). On the contrary, there is no flag information corresponding to the normal power-off event in the non-volatile storage circuit 130 when the mains power is stopped, when a user unplugs a plug by mistake, when a user presses a reset key on the hardware, or when a power supply circuit fails (not normal power-off event). Accordingly, when there is the flag information corresponding to the normal power-off event in non-volatile storage circuit 130, the determination method 200 enters operation S240. In operation S240, the main chip 110 determines that the reason of the cold boot event is the normal power-off event.

When there is no flag information corresponding to the normal power-off event in non-volatile storage circuit 130, the determination method 200 enters operation S250. In operation S250, the main chip 110 determines whether a time difference is greater than a threshold time Tth. Since the clock circuit 120 consumes very little power (almost no power), the clock circuit 120 can continue to operate during the aforementioned condition (e.g., there is a capacitor or other power storage element in the clock circuit 120 to provide power required by the clock circuit 120). Accordingly, after the cold boot event, the main chip 110 can read the time T2 from the clock circuit 120. Then, the main chip 110 can calculate the time difference between the time T2 and the time T1, and can determine whether the time difference between the time T2 and the time T1 is greater than the threshold time Tth. In some embodiments, it is assumed that the main chip 110 reads the time outputted from the clock circuit 120 with a fixed period of M seconds (e.g., 1 second). In addition, it is assumed that it takes N seconds (e.g., 3 seconds) from the timing when the cold event occurs to the timing when the main chip 110 reads out the time stored in non-volatile storage circuit 130. The threshold time Tth is (M+N) seconds (e.g., 4 seconds).

When the main chip 110 determines that the time difference between the time T2 and the time T1 is greater than the threshold time Tth, the determination method 200 enters operation S260. In operation S260, the main chip 110 determines that the reason of the cold boot event is an abnormal power-off event (the mains power is stopped or a user unplugs a plug by mistake). In general, when the mains power is stopped or a user unplugs a plug by mistake, the power interruption period will not be too short (e.g., not shorter than 4 seconds). Thus. when the time difference between the time T2 and the time T1 is greater than the threshold time Tth, the main chip 110 can determine that the reason of the cold boot event is the abnormal power-off event (the mains power is stopped or a user unplugs a plug by mistake).

When the main chip 110 determines that the time difference between the time T2 and the time T1 is less than or equal to the threshold time Tth, the determination method 200 enters S270. In operation S270, the main chip 110 determines whether the output terminal OUT1 the detector circuit 140 has a low logic value so as to determine whether the reason of the cold boot event is a power failure event (the power supply circuit 160 is unstable or the power supply circuit 160 provides insufficient power) or a reset-key event (a user presses a reset key on the hardware).

The details about the detector circuit 140 are described in following paragraphs. It takes a low logic value as logic value 0 and a high logic value as logic value 1 as an example.

Figure 3:
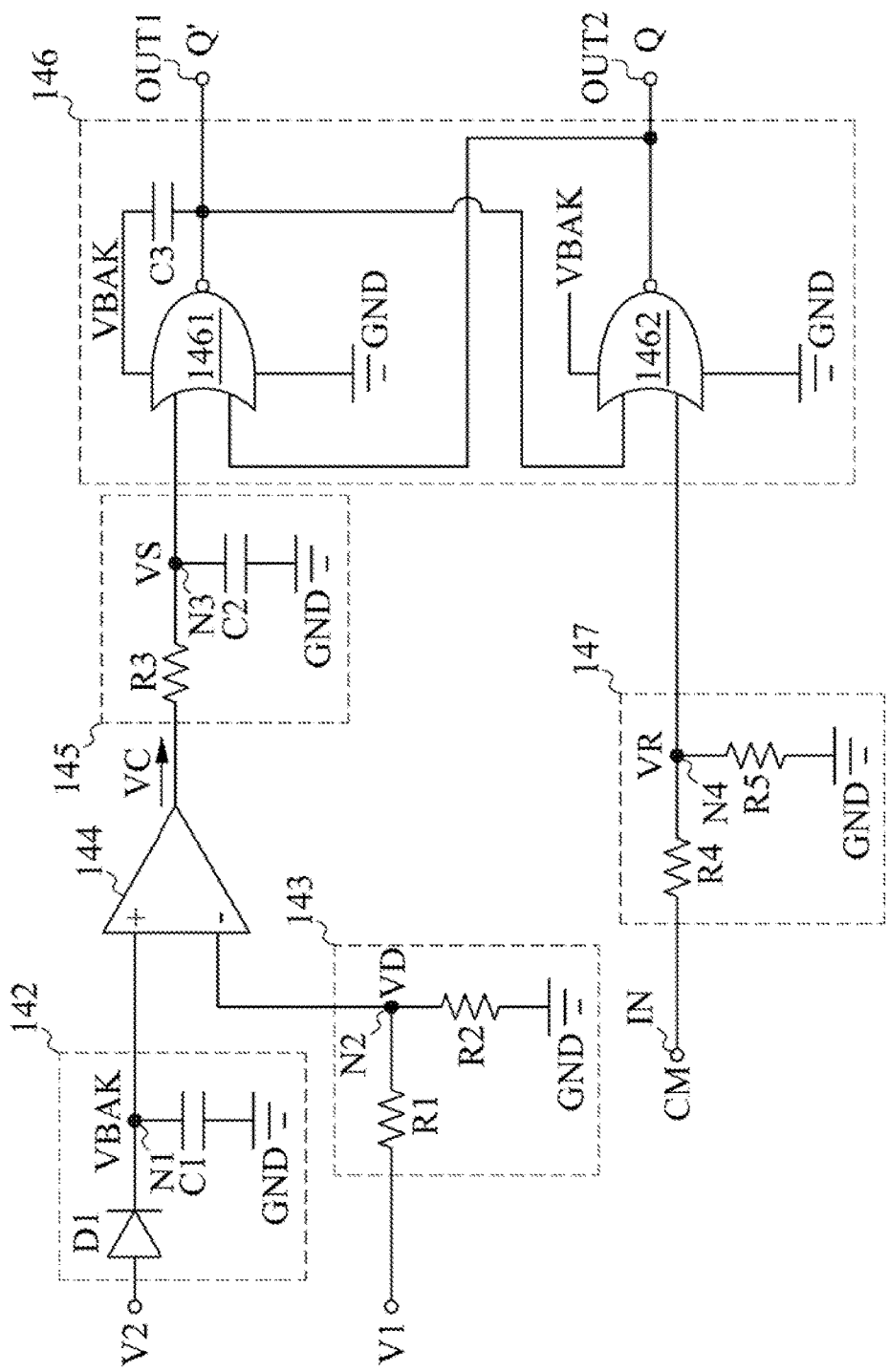
FIG. 3 is a schematic diagram of a detector circuit according to some embodiments of the present disclosure.

Reference is made to FIG. 3. FIG. 3 is a schematic diagram of the detector circuit 140 according to some embodiments of the present disclosure.

As illustrated in FIG. 3, the detector circuit 140 includes a backup voltage establishment circuit 142, a voltage divider circuit 143, a comparator circuit 144, a resistor-capacitor circuit 145, a latch circuit 146, and a voltage divider circuit 147.

The backup voltage establishment circuit 142 is used to establish a backup voltage VBAK (e.g., 3 volts) according to the voltage V2 (e.g., 3.3 volts). As illustrated in FIG. 3, the backup voltage establishment circuit 142 includes a diode D1 and a capacitor C1. An anode terminal of the diode D1 is used to receive the voltage V2, a cathode terminal of the diode D1 couples a first terminal of the capacitor C1 at a node N1, and a second terminal of the capacitor C1 is coupled to a ground terminal GND. When the diode D1 is turned on, the backup voltage VBAK is generated at the node N1 in response to the voltage V2.

The voltage divider circuit 143 is used to generate a voltage-divided voltage VD according to the voltage V1. As illustrated in FIG. 3, the voltage divider circuit 143 includes a resistor R1 and a resistor R2. A first terminal of the resistor R1 is used to receive the voltage V1, a second terminal of the resistor R1 couples a first terminal of the resistor R2 at node N2, and a second terminal of the resistor R2 is coupled to the ground terminal GND. Based on a resistance ratio of the resistor R1 and the resistor R2, the voltage-divided voltage VD is generated at the node N2 in response to the voltage V1. When the voltage V1 is fully supplied, the voltage-divided voltage VD is greater than the backup voltage VBAK.

The comparator circuit 144 is used to compare the backup voltage VBAK with the voltage-divided voltage VD to generate a comparison voltage VC. In some embodiments, the comparator circuit 144 is implemented by a comparator. As illustrated in FIG. 3, the comparator circuit 144 includes a positive input terminal, a negative input terminal, and an output terminal. The positive input terminal of the comparator circuit 144 is coupled to the node N1 to receive the backup voltage VBAK. The negative input terminal of the comparator circuit 144 is coupled to the node N2 to receive the voltage-divided voltage VD. When the voltage-divided voltage VD is greater than or equal to the backup voltage VBAK, the comparator circuit 144 outputs the comparison voltage VC with a low logic value. When the voltage-divided voltage VD is less than the backup voltage VBAK, the comparator circuit 144 outputs the comparison voltage VC with a high logic value.

The resistor-capacitor circuit 145 is used to generate a set voltage VS according to the comparison voltage VC. As illustrated in FIG. 3, the resistor-capacitor circuit 145 includes a resistor R3 and a capacitor C2. A first terminal of the resistor R3 is used to receive the comparison voltage VC, a second terminal of the resistor R3 couples a first terminal of the capacitor C2 at a node N3, and a second terminal of the capacitor C2 is coupled to the ground terminal GND. Based on a time constant of the resistor-capacitor circuit 145, the set voltage VS is generated at the node N3 in response to the comparison voltage VC.

The latch circuit 146 is used to generate a latch signal Q and an inversion latch signal Q' according to the set voltage VS and a reset voltage VR. In the embodiment of FIG. 3, the latch circuit 146 is a SR latch, but the present disclosure is not limited thereto. As illustrated in FIG. 3, the latch circuit 146 includes a NOR gate 1461 and a NOR gate 1462. A first input terminal of the NOR gate 1461 is coupled to the node N3 to receive the set voltage VS, a second input terminal of the NOR gate 1461 is coupled to an output terminal of the NOR gate 1462, and an output terminal of the NOR gate 1461 is coupled to a capacitor C3. An output terminal of the NOR gate 1461 is the output terminal OUT1 of the detector circuit 140, and the output terminal OUT1 is used to output the inversion latch signal Q'. A first input terminal of the NOR gate 1462 is coupled to the output terminal of the NOR gate 1461, a second input terminal of the NOR gate 1462 is coupled to a node N4 to receive the reset voltage VR. An output terminal of the NOR gate 1462 is the output terminal OUT2 of the detector circuit 140, and the output terminal OUT2 is used to output the latch signal Q.

The voltage divider circuit 147 is used to generate the reset voltage VR according to a reset signal CM from the main chip 110. As illustrated in FIG. 3, the voltage divider circuit 147 includes a resistor R4 and a resistor R5. A first terminal of the resistor R4 is coupled to the input terminal IN to receive the reset signal CM from the main chip 110, a second terminal of the resistor R4 couples a first terminal of the resistor R5 at the node N4, and a second terminal of the resistor R5 is coupled to the ground terminal GND. Based on a resistance ratio of the resistor R4 and the resistor R5, the reset voltage VR is generated at the node N4 in response to the reset signal CM.

In general, when the power supply circuit 160 provides power normally, the voltage V1 is established earlier than the voltage V2. It is assumed that when the power supply circuit 160 provides power normally, a maximum voltage of the voltage V1 is 5 volts, a maximum voltage of the voltage V2 is 3.3 volts, a maximum voltage of the backup voltage VBAK is 3 volts, and a maximum voltage of the voltage-divided voltage VD is 3.75 volts. When a user presses the reset key on the hardware, the power supply circuit 160 still provides power normally. In other words, the voltage V1 has sufficient power. Under this condition, since the voltage-divided voltage VD at the negative input terminal of the comparator circuit 144 is greater than the backup voltage VBAK at the positive input terminal of the comparator circuit 144, the comparison voltage VC has the low logic value. At this time, the reset signal CM from the main chip 110 also has the low logic value. Thus, the reset voltage VR has the low logic value. Accordingly, the inversion latch signal Q' at the output terminal OUT1 has the high logic value, and the latch signal Q at the output terminal OUT2 has the low logic value.

However, when the power supply circuit 160 fails (the power supply circuit 160 is unstable or the power supply circuit 160 provides insufficient power), the voltage V1 is with insufficient power. Under this condition, the voltage-divided voltage VD at the node N2 decreases (e.g., less than 3 volts). However, the backup voltage VBAK at the node N1 will maintain at its maximum voltage value (e.g., 3 volts) for a period of time due to the power storage characteristic of the capacitor C1 and the low power consumption of the overall circuit. Under this condition, since the voltage-divided voltage VD at the negative terminal of the comparator circuit 144 is less than the backup voltage VBAK at the positive terminal of the comparator circuit 144, the comparison voltage VC has the high logic value. At this time, the reset signal CM from the main chip 110 also has the low logic value. Thus, the reset voltage VR has the low logic value. Accordingly, the inversion latch signal Q' at the output terminal OUT1 has the low logic value, and the latch signal Q at the output terminal OUT2 has the high logic value.

Based on principles above, when the output terminal OUT1 of the detector circuit 140 has the high logic value (the determination of operation S270 is "NO"), the determination method 200 enters operation S280. In operation S280, the main chip 110 determines that the reason of the cold boot event is the reset-key event. When the output terminal OUT1 of the detector circuit 140 has the low logic value (the determination of operation S270 is "YES"), the determination method 200 enters operation S290. In operation S290, the main chip 110 determines that the reason of the cold boot event is the power failure event.

In some embodiments, when the main chip 110 determines the reason of the cold boot event, the main chip 110 can automatically generate an electronic document and the electronic document can record the reason of the cold boot event. The main chip 110 can optimize the operations of the electronic system 100 according to this electronic document. In some embodiments, the display panel 150 can display this electronic document (to display the reason of the cold boot event) for a designer to quickly know the reason of the cold boot event. In some embodiments, there are multiple electronic systems 100, and the electronic systems 100 can send the reasons of the cold boot events to a server respectively. This server can analyze the data sent from the electronic systems 100 to determine the environment condition (whether the mains power is stable) of the electronic systems 100 or determine quality of the power supply circuit (whether the power supply circuit 160 is stable) so as to optimize the operations of the electronic systems 100 according to the determination.

In some embodiments, when the main chip 110 determines that the reason of the cold boot event, the main chip 110 can send the reset signal CM with the high logic value to reset the latch circuit 146. For example, the main chip 110 can send the reset signal CM with the high logic value to generate a reset voltage VR with the high logic value at the node N4 to reset the latch circuit 146. When the latch circuit 146 is reset, the detector circuit 140 is able to determine the reason of a next cold boot event.

In some related approaches, an external microcontroller and an additional power supply for providing power to the external microcontroller are disposed to monitor the electronic system (e.g., recording the cold boot event and determining the reason of the cold boot event). However, the cost will increase due to the external microcontroller and the additional power supply.

Compared to the aforementioned related approaches, in the present disclosure, the main chip 110 (for controlling overall operations of the electronic system 100) is utilized to work with the detector circuit 140 to determine the reason of the cold boot event. Since the present disclosure does not need the external microcontroller and the additional power supply for providing power to the external microcontroller, the present disclosure can lower the cost. In addition, compared to the external microcontroller and the additional power supply for providing power to the external microcontroller, the cost of the components in the detector circuit 140 is low, so the present disclosure has the advantage of low cost. Further, since the current of the detector circuit 140 is smaller, the present disclosure has the advantage of low power consumption and does not need to dispose other power supplies.

It takes the main chip 110 to read the output terminal OUT1 of the detector circuit 140 in operation S270 in the aforementioned embodiments above, but the present disclosure is not limited thereto. In some other embodiments, the main chip 110 can read the output terminal OUT2 of the detector circuit 140. When the output terminal OUT2 of the detector circuit 140 has the high logic value, the main chip 110 determines that the reason of the cold boot event is the power failure event. When the output terminal OUT2 of the detector circuit 140 has the low logic value, the main chip 110 determines that the reason of the cold boot event is the reset-key event. However, when the power failure event occurs, compared to reading the output terminal OUT2, reading the output terminal OUT1 has the advantage of less power consumption. The reason is that the output terminal OUT1 outputs the inversion latch signal Q' with the low logic value when the power failure event occurs. The inversion latch signal Q' with the low logic value is driven by a lower side transistor in the NOR gate 1461 according to a ground voltage at the ground terminal GND. Thus, this method has lower power consumption.

Figure 4:
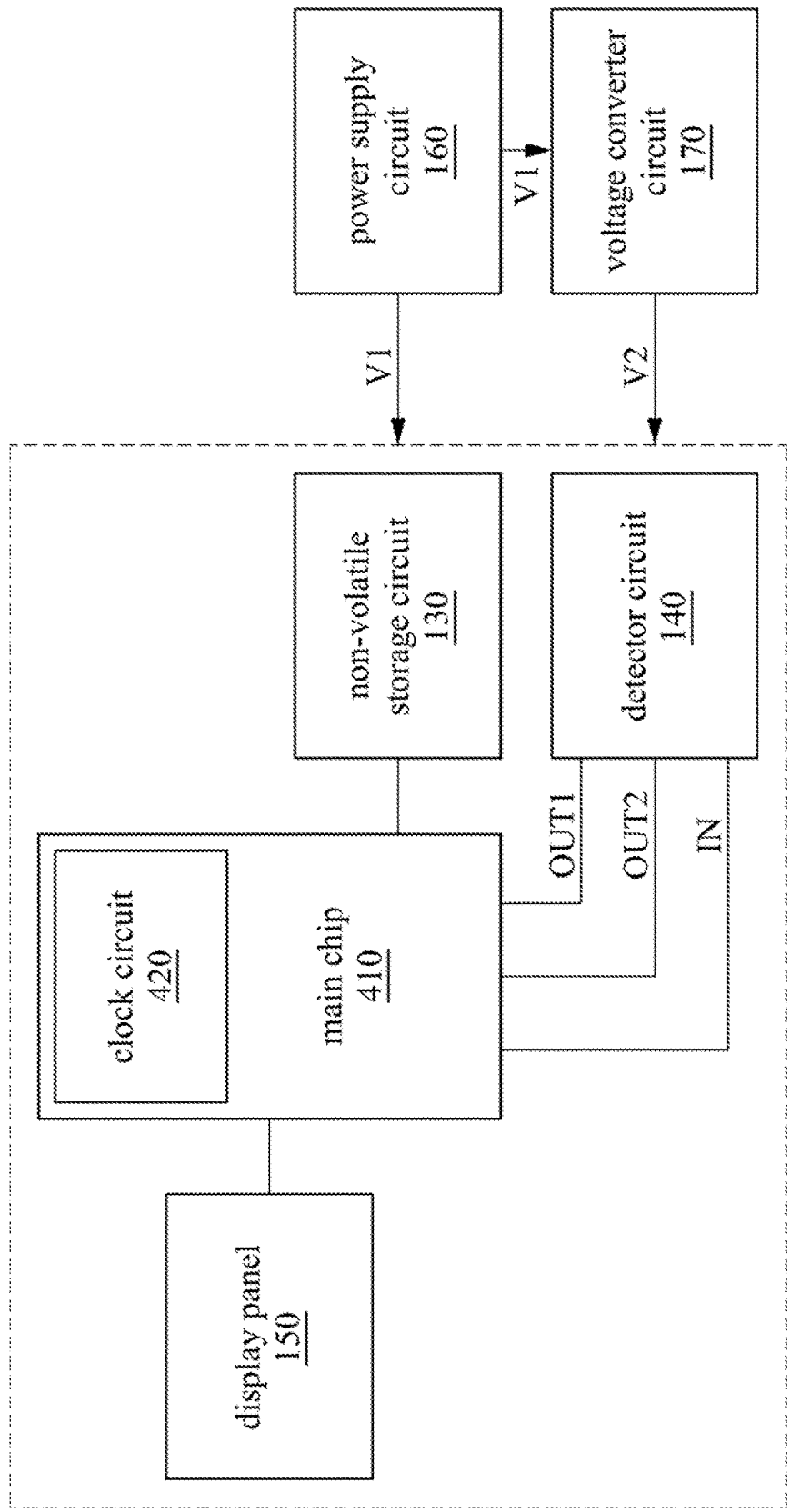
FIG. 4 is a schematic diagram of an electronic system capable of determining a reason of a cold boot event according to some embodiments of the present disclosure.

Reference is made to FIG. 4. FIG. 4 is a schematic diagram of an electronic system 400 capable of determining a reason of a cold boot event according to some embodiments of the present disclosure.

The electronic system 400 in FIG. 4 is similar to the electronic system 100 in FIG. 1. One of major differences between the electronic system 400 and the electronic system 100 is that a clock circuit 420 is disposed in a main chip 410. The structure in FIG. 4 is simpler. Since operations of the electronic system 400 are similar to those of the electronic system 100, they are nor described herein again.

As described above, in the present disclosure, the main chip can work with the detector circuit to determine the reason of the cold boot event. Thus, there is no need to dispose an external microcontroller and an additional power supply providing power to the external microcontroller in the present disclosure. Thus, the present disclosure can lower the cost.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic system, comprising:
    a main chip configured to read first time of a clock circuit;
    a non-volatile storage circuit coupled to the main chip, wherein the main chip stores the first time into the non-volatile storage circuit; and
    a detector circuit comprising a first output terminal, wherein the first output terminal is coupled to the main chip,
    wherein when a cold boot event occurs, the main chip reads the first time from the non-volatile storage circuit, and determines a reason of the cold boot event according to the first time, a second time of the clock circuit, and a logic value at the first output terminal,
    wherein the detector circuit comprises:
        a voltage divider circuit configured to generate a voltage-divided voltage according to a first voltage;
        a backup voltage establishment circuit configured to establish a backup voltage according to a second voltage;
        a comparator circuit configured to compare the voltage-divided voltage with the backup voltage to generate a comparison voltage; and
        a latch circuit configured to generate a latch signal and an inversion latch signal according to a reset voltage and a set voltage corresponding to the comparison voltage, wherein the inversion latch signal is at the first output terminal, and the latch signal is generated at a second output terminal of the detector circuit.

2. The electronic system of claim 1, wherein the main chip determines whether the reason is a normal power-off event according to flag information in the non-volatile storage circuit.

3. The electronic system of claim 2, wherein when the reason is not the normal power-off event, the main chip determines whether a time difference between the first time and the second time is greater than a threshold time, wherein when the time difference is greater than the threshold time, the main chip determines that the reason is an abnormal power-off event.

4. The electronic system of claim 3, wherein when the time difference is less than or equal to the threshold time, the main chip reads the logic value at the first output terminal to determine that the reason is a power failure event or a reset-key event.

5. The electronic system of claim 4, wherein when the logic value at the first output terminal is a low logic value, the main chip determines that the reason is the power failure event, wherein when the logic value at the first output terminal is a high logic value, the main chip determines that the reason is the reset-key event.

6. The electronic system of claim 1, further comprising:
a voltage converter circuit configured to convert the first voltage into the second voltage, wherein the second voltage is less than the first voltage.

7. The electronic system of claim 1, wherein the backup voltage establishment circuit comprises:
a diode configured to receive the second voltage; and
a capacitor coupled to a ground terminal and coupling the diode at a first node,
wherein the first node is coupled to a positive input terminal of the comparator circuit.

8. The electronic system of claim 7, wherein the voltage divider circuit comprises:
a first resistor configured to receive the first voltage; and
a second resistor coupled to the ground terminal and coupling the first resistor at a second node,
wherein the second node is coupled to a negative input terminal of the comparator circuit.

9. The electronic system of claim 1, further comprising:
a display panel configured to display the reason of the cold boot event.

10. The electronic system of claim 1, wherein the clock circuit is disposed outside of the main chip.

11. The electronic system of claim 1, wherein the clock circuit is disposed inside of the main chip.

12. A determination method for determining a reason of a cold boot event, comprising:
when the cold boot event occurs, reading, by a main chip, first time of a clock circuit stored in a non-volatile storage circuit; and
determining, by the main chip, the reason of the cold boot event according to the first time, a second time of the clock circuit, and a logic value at a first output terminal of a detector circuit, comprising:
generating, by a voltage divider circuit in the detector circuit, a voltage-divided voltage according to a first voltage;
establishing, by a backup voltage establishment circuit in the detector circuit, a backup voltage according to a second voltage;
comparing, by a comparator circuit in the detector circuit, the voltage-divided voltage with the backup voltage to generate a comparison voltage; and
generating, by a latch circuit in the detector circuit, a latch signal and an inversion latch signal according to a reset voltage and a set voltage corresponding to the comparison voltage,
wherein the inversion latch signal is at the first output terminal, and the latch signal is generated at a second output terminal of the detector circuit.

13. The determination method of claim 12, further comprising:
determining, by the main chip, whether the reason is a normal power-off event according to flag information in the non-volatile storage circuit.

14. The determination method of claim 13, further comprising:
when the reason is not the normal power-off event, determining, by the main chip, whether a time difference between the first time and the second time is greater than a threshold time; and
when the time difference is greater than the threshold time, determining, by the main chip, that the reason is an abnormal power-off event.

15. The determination method of claim 14, further comprising:
when the time difference is less than or equal to the threshold time, reading, by the main chip, the logic value at the first output terminal to determine that the reason is a power failure event or a reset-key event.

16. The determination method of claim 15, further comprising:
when the logic value at the first output terminal is a low logic value, determining, by the main chip, that the reason is the power failure event; and
when the logic value at the first output terminal is a high logic value, determining, by the main chip, that the reason is the reset-key event.

17. The determination method of claim 12, further comprising:
converting, by a voltage converter circuit, the first voltage into the second voltage, wherein the second voltage is less than the first voltage.

18. The determination method of claim 12, further comprising:
displaying, by a display panel, the reason of the cold boot event.

* * * * *